United States Patent
Senatalar et al.

(10) Patent No.: US 9,561,967 B2
(45) Date of Patent: Feb. 7, 2017

(54) ZEOLITE COATING PREPARATION ASSEMBLY AND OPERATION METHOD

(71) Applicant: INVENTRAM FIKRI MULKIYET HAKLARI YONETIM TICARET VE YATIRIM ANONIM SIRKETI, Istanbul (TR)

(72) Inventors: Ayse Senatalar, Istanbul (TR); Melkon Tatlier, Istanbul (TR)

(73) Assignee: INVENTRAM FIKRI MULKIYET HAKLARI YONETIM TICARET VE YATIRIM ANONIM SIRKETI, Istanbul (TR)

( * ) Notice: Subject to any disclaimer, the term of this patent is extended or adjusted under 35 U.S.C. 154(b) by 0 days.

(21) Appl. No.: 14/847,013

(22) Filed: Sep. 8, 2015

(65) Prior Publication Data

US 2016/0060128 A1 Mar. 3, 2016

Related U.S. Application Data

(63) Continuation of application No. 14/381,979, filed on Aug. 28, 2014, now Pat. No. 9,180,429.

(51) Int. Cl.
| | |
|---|---|
| *H05B 6/02* | (2006.01) |
| *H05B 6/24* | (2006.01) |
| *C01B 39/02* | (2006.01) |
| *B01J 20/18* | (2006.01) |
| *B01J 20/32* | (2006.01) |

(Continued)

(52) U.S. Cl.
CPC .............. *C01B 39/02* (2013.01); *B01J 20/18* (2013.01); *B01J 20/3238* (2013.01); *B01J 29/06* (2013.01);

(Continued)

(58) Field of Classification Search
CPC ............. C23C 18/1212; C23C 18/1287; C23C 18/1291; B01J 19/087; B01J 20/18; B01J 20/3238; C01B 39/02
See application file for complete search history.

(56) References Cited

U.S. PATENT DOCUMENTS

6,078,135 A 6/2000 Lee et al.
7,798,334 B2 * 9/2010 Mizuno ................ B01D 63/065
210/500.22

FOREIGN PATENT DOCUMENTS

CN 1730391 A 2/2006
CN 101754508 B 11/2011
(Continued)

OTHER PUBLICATIONS

Slangen et al, "Induction Heating: A Novel Tool for Zeolite Synthesis", Zeolite vol. 18, pp. 63-66, 1997.*

(Continued)

*Primary Examiner* — Michael Wieczorek
(74) *Attorney, Agent, or Firm* — Gokalp Bayramoglu

(57) ABSTRACT

The present invention relates to a zeolite coating preparation assembly and operation method wherein zeolite adsorbents are coated by crystallization process on various surfaces heated by induction. The objective of the present invention is to provide a zeolite coating preparation assembly and operation method; by which time saving is achieved owing to heating by induction, material saving is achieved owing to heating by induction, material saving is achieved since large heating resistances and complicated reactors are not used; and which is thus more economical; and wherein thicker and more stable coatings with high diffusion coefficients are prepared by using a more practical reaction system in a shorter period of time in comparison to the known methods, and wherein mass production is enabled.

4 Claims, 3 Drawing Sheets

(51) Int. Cl.
*B01J 29/06* (2006.01)
*B01J 37/02* (2006.01)
*B01J 37/34* (2006.01)
*B01J 35/02* (2006.01)
*C23C 18/12* (2006.01)

(52) U.S. Cl.
CPC ............ *B01J 35/02* (2013.01); *B01J 37/0217* (2013.01); *B01J 37/342* (2013.01); *C23C 18/1212* (2013.01); *C23C 18/1287* (2013.01); *C23C 18/1291* (2013.01)

(56) References Cited

FOREIGN PATENT DOCUMENTS

| | | |
|---|---|---|
| JP | 2002167674 A | 6/2002 |
| JP | 2006256066 A | 9/2006 |
| KR | 100247664 B1 | 3/2000 |
| WO | WO2005014481 A1 | 2/2005 |
| WO | WO2010120738 A1 | 10/2010 |

OTHER PUBLICATIONS

Ayse Erdem-Senatalar, Melkon Tather, Mustafa Urgen: "Preparation of Zeolite Coatings by Direct Heating of the Substrates", Microporous and Mesoperous Materials, 32 (1999), pp. 331-343.

Tatlier, M., Erdem-Senatalar, A.: "The Stability of Zeolite Coatings Grown on Metal Supports for Heat Pump Applications", Studies in Surface Science and Catalysis, vol. 125, Elsevier, Amsterdam, pp. 101-108, 1999.

Tatlier, M., Tantekin-Ersolmaz, S.B., Erdem-Senatalar, A.: "Diffusivities of Zeolite Coatings", (Proc. 13th International Zeolite Conference, 2001, Montpellier, France), A. Galarneau, F.Di Renzo, F. Fajuia, J. Vedrine (ed.), Studies in Surface Science and Catalysis, vol. 135, Elsevier, Amsterdam, 3249-3256 (2001).

Erdem-Senatalar, A., Oner, K., Tatlier, M.: "Searching for Clear Solution Compositions by Using the Substrate Heating Method", Studies in Surface Science and Catalysis, vol. 154 part A-C, pp. 667-670, 2004.

Tatlier, M, Erdem-Senatalar, A.: "Estimation of the Effective Diffusion Coefficients in Open Zeolite Coatings", Chemical Engineering Journal, 102 (3), pp. 209-216, 2004.

Tatlier, M.,Demir, M., Tokay, B., Erdem-Senatalar, A., Kiwi-Minsker, L.: "Substrate Heating Method for Coating Metal Surfaces with High-Silica Zeolites: ZSM-5 Coatings on Stainless Steel Plates", Microporous and Mesoporous Materials, 101 (3), pp. 374-380, 2007.

Schnabel, L., Tatlier, M., Schmidt, F., Erdem-Senatalar, A.: "Adsorption Kinetics of Zeolite Coatings Directly Crystallized on Metal Supports for Heat Pump Applications", Applied Thermal Engineering, 30 (Nov. 2012), pp. 1409-1416, 2010.

\* cited by examiner

ZEOLITE COATING PREPARATION ASSEMBLY AND OPERATION METHOD

CROSS REFERENCE TO RELATED PATENT APPLICATION

This is a continuation of application U.S. patent Ser. No. 14/381,979 filed Aug. 28, 2014, and issued as U.S. Pat. No. 9,180,429.

FIELD OF THE INVENTION

The present invention relates to a zeolite coating preparation assembly and operation method wherein zeolite adsorbents are coated by crystallization process on various surfaces heated by induction.

BACKGROUND OF THE INVENTION

Zeolites are synthesized from a reaction mixture by means of hydrothermal crystallization. A reaction mixture is prepared by mixing suitable proportions of the required reactants in order to obtain the aimed zeolite type. When this mixture is heated, at the end of certain periods of time, nuclei of the zeolite crystals are formed and then the crystals start to grow. When there is a substrate in the medium immersed in the reaction mixture, the nuclei/crystals often chemically bind with this substrate and form a zeolite coating which is strongly attached thereon. Properties of this coating depend on the composition of the reaction mixture that is used, and the experimental conditions such as reaction temperature and time and mixing. Use of dilute solutions as the reaction mixture instead of highly viscous gels used in conventional zeolite synthesis has a positive impact on the coating quality.

Since zeolites are metastable materials, a zeolite phase synthesized from a reaction composition transforms into other phases after longer reaction times. This situation impedes the coatings from being sufficiently thick when the conventional single step synthesis method is used for many zeolite phases. In cases where metastable phase transformation does not occur, since composition of the solution changes as the time increases, as a result of the crystallization activity in the reaction solution, preparing a thick coating is still not easy. Multi-step methods that may be used for preparation of thick coatings are not practical or economical. Additionally, strength of the thick coatings is also low when these methods are used and the coatings have a very compact structure that will make diffusion difficult.

In the method of direct heating of the substrate by conduction, wherein the substrate is heated by the help of a resistance (one of the state-of-the-art applications), the reaction solution is kept at a temperature that is lower than the reaction temperature by the help of a water bath. In this manner, phase transformation of the zeolite is delayed for long periods of time and thus thicker coatings can be obtained in comparison to the conventional methods. These coatings also have an open structure, high diffusion coefficient and relatively higher stability which are necessary for many applications, especially for adsorption heat pump applications.

There are several articles in the literature related to direct heating of the substrate materials by using the method of heating by conduction: "Erdem-Senatalar, A., Tatlier, M., Urgen, M., "Preparation of Zeolite Coatings by Direct Heating of the Substrates", Microporous and Mesoporous Materials, 32(3), 331-343 (1999)"; "Tatlier, M., Erdem-Senatalar, A., "The Stability of Zeolite Coatings Grown on Metal Supports for Heat Pump Applications", Studies in Surface Science and Catalysis, Vol. 125, Elsevier, Amsterdam, 101-108 (1999)"; "Tatlier, M., Tantekin-Ersolmaz, S. B., Erdem-Senatalar, A., "Diffusivities of Zeolite Coatings", (Proc. 13$^{th}$ International Zeolite Conference, 2001, Montpellier, France), A. Galarneau, F. Di Renzo, F. Fajula, J. Vedrine (ed.), Studies in Surface Science and Catalysis, Vol. 135, Elsevier, Amsterdam, 3249-3256 (2001)"; "Erdem-Senatalar, A., Oner, K., Tatlier, M., "Searching for Clear Solution Compositions by Using the Substrate Heating Method", Studies in Surface Science and Catalysis, Vol. 154 part A-C, 667-670 (2004)"; "Tatlier, M., Erdem-Senatalar, A., "Estimation of the Effective Diffusion Coefficients in Open Zeolite Coatings", Chemical Engineering Journal, 102(3), 209-216 (2004)"; "Tatlier, M. Demir, M., Tokay, B., Erdem-Senatalar, A., Kiwi-Minsker, L., "Substrate Heating Method for Coating Metal Surfaces with High-Silica Zeolites: ZSM-5 Coatings on Stainless Steel Plates". Microporous and Mesoporous Materials, 101(3), 374-380 (2007)"; Schlabel, L., Tatlier, M., Schmidt, F., Erdem-Senatalar, A., "Adsorption Kinetics of Zeolite Coatings Directly Crystallized on Metal Supports for Heat Pump Applications", Applied Thermal Engineering, 30(11/12), 1409-1416 (2010)".

International patent document no. WO02010120738, an application known in the art, discloses a method of coating a metal surface with a protective metal coating having a lower melting point. After the surface to be coated is heated up to the melting point of the metal coating in a high frequency induction heater, the molten metal coating is immediately applied on the heated surface.

Chinese Patent document no. CN101754508, an application known in the art, discloses an induction heater used for coating steel surfaces. The system includes independent induction heaters and on the upper parts thereof copper coils. Water nozzles are provided at the head ends and the tail ends of the induction coils. The said heater has a simple structure and a high efficiency.

Japanese patent document no. JP2006256066, an application in the state of the art, discloses a method for coating the surface of a substrate with a resin. During coating, the resin acquires the shape of the surface and this shape can be maintained. In the contact process used in the method, the material containing a thermoplastic resin is ensured to contact the surface of the conductive substrate. Then temperature of the substrate surface is increased by means of the induction heater.

SUMMARY OF THE INVENTION

The objective of the present invention relates to a zeolite coating preparation assembly and operation method by which synthesis process is shortened owing to heating by induction and this way time is saved.

Another objective of the present invention relates to a zeolite coating preparation assembly and operation method, by which material saving is achieved since large heating resistances and complicated reactors are not used, and which is thus more economical.

A further objective of the present invention relates to a zeolite coating preparation assembly and operation method for preparing a zeolite coating with desired thickness in shorter periods of time relative to the known methods.

Another objective of the present invention relates to a zeolite coating preparation assembly and operation method wherein the coatings are obtained in a thicker and more stable form by using a more practical and suitable reaction system.

Another objective of the present invention relates to a zeolite coating preparation assembly and operation method wherein mass production is enabled.

DETAILED DESCRIPTION OF THE INVENTION

"A zeolite coating preparation assembly and operation method" developed to fulfill the objective of the present invention is illustrated in the accompanying figure, in which.

Figure 1:
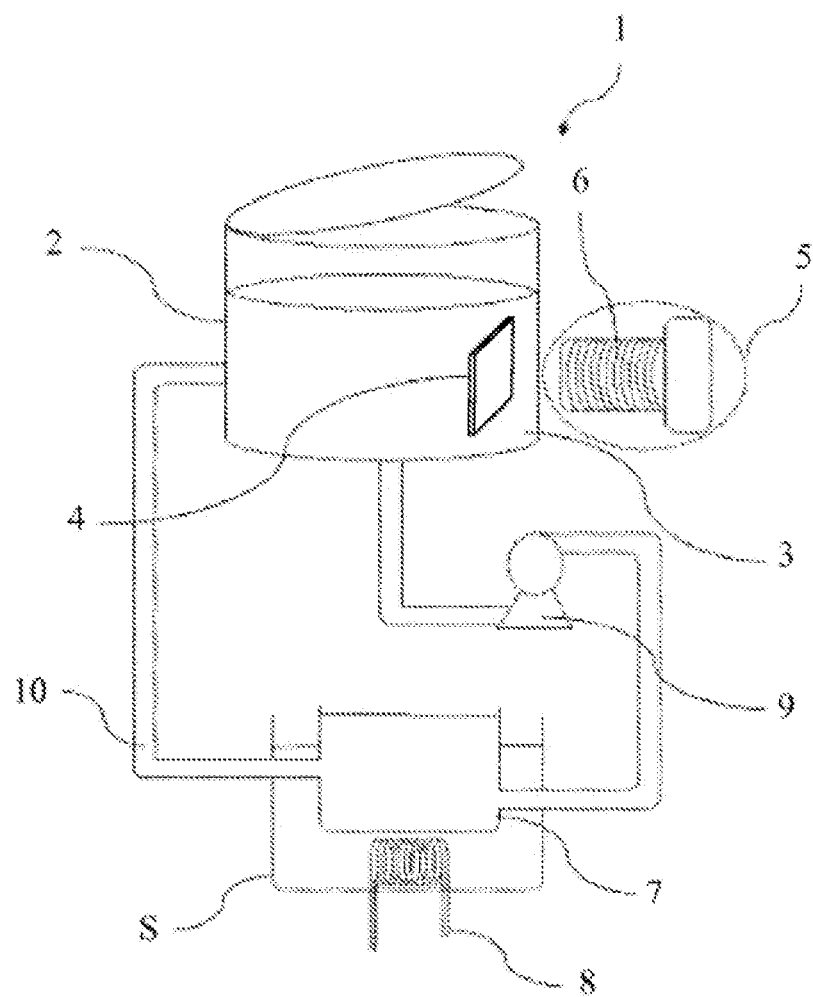
FIG. 1 is the schematic view of the zeolite coating assembly.

The components shown in the figure are each given reference numbers as follows:
1. Zeolite coating assembly
2. Reactor
3. Synthesis solution
4. Substrate
5. Induction device
6. Coil
7. Feeding tank
8. Heat exchanger
9. Pump
10. Connection line
S. Water bath The inventive zeolite coating assembly (1) comprises:
at least one reactor (2) wherein the reaction is carried out and which is preferably a container lidded on top,
synthesis solution (3) which is filled into the reactor (2) and which includes the reactants that are used for preparing the zeolite coating,
at least one substrate (4) which is immersed in the synthesis solution (3) and which is preferably in the form of a flat plate,
at least one induction device (5) which is located outside of the reactor (2) and is positioned near the reactor (2) such that the magnetic field that it generates by passing electric current over its coil (6) is located at a distance that will affect the substrate (4) within the reactor (2),
at least one feeding tank (7) in the form of a container by which a part of the synthesis solution (3) is kept outside of the reactor (2),
at least one heat exchanger (8) which is directly or indirectly in contact with the feeding tank (7) and which changes the temperature of the synthesis solution (3) within the feeding tank (7),
at least one pump (9) which enables circulation of the synthesis solution (3) via a connection line (10) lying between the feeding tank (7) and the reactor (2).

In the preferred embodiment of the invention, temperature of the synthesis solution (3) is changed by means of a water bath (S) in which the feeding tank (7) is immersed, in such a way that the heat exchanger (8) does not directly contact the synthesis solution (3) so that chemical composition of the synthesis solution (3) is not affected.

In the preferred embodiment of the invention, a reactor (2) made of a material with a low electrical conductivity is used for preventing zeolite formation on the reactor (2) walls and preventing the heated reactor (2) from unnecessarily heating the synthesis solution (3).

In the preferred embodiment of the invention, the synthesis solution (3) is prepared as diluted in order to enhance the quality of the coating.

In the preferred embodiment of the invention, in order to prevent metastable phase transformation and to enable the preparation of thick coatings, the water bath (S) temperature is adjusted so as to keep the temperature of the synthesis solution (3) in the reactor (2) at a desired value that is lower than the temperature of the substrate (4).

In the preferred embodiment of the invention, a substrate (4), which has a high electrical conductivity and is preferably made of a ferromagnetic material, is used in order to enhance the effect of the magnetic field generated by the induction device (5) on coating formation.

In the preferred embodiment of the invention, the substrate (4) is vertically immersed within the synthesis solution (3) in the reactor (2) in order to increase the coating thickness, coating stability and the effective diffusion coefficient of the coating.

The inventive zeolite coating method (1) comprises the steps of
determining and preparing the reactor (2),
preparing the synthesis solution (3) and filling it into the reactor (2),
cleaning the substrate (4) with suitable methods and placing it in the solution (3) filled into the reactor (2),
placing the reactor (2) near the coil (6) of the induction device (5),
adjusting the distance between the coil (6) and the reactor (2) and/or the power of the induction device (5) so as to provide the desired substrate (4) temperature.
circulating the synthesis solution (3) that is in the reactor (2) by the help of a pump (9) between the water bath (S) and the reactor (2),
adjusting the water bath (S) temperature so as to keep the temperature of the synthesis solution (3) in the reactor (2) at a desired value that is lower than the temperature of the substrate (4),
producing magnetic field by operating the induction device (5),
performing the synthesis at the desired temperature and time,
removing the substrate (4) from the solution (3),
cleaning the coating with water,
obtaining the final product.

Figure 2:
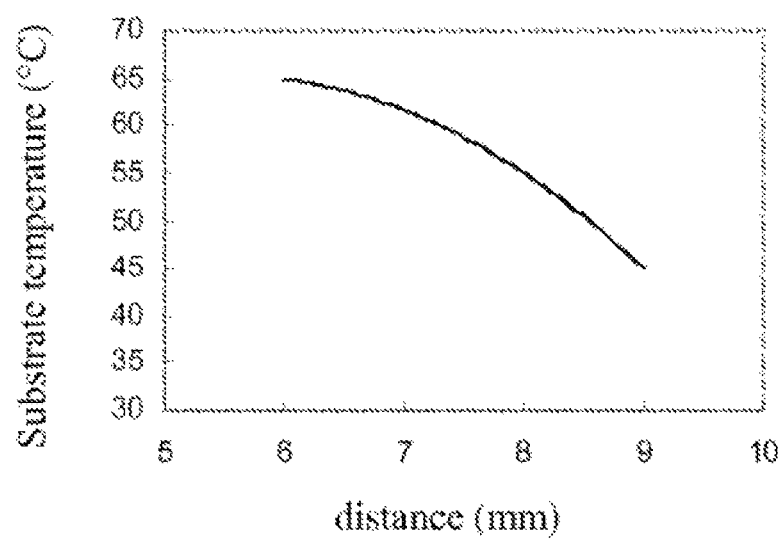
FIG. 2 is the representation of the change in the substrate temperature according to the distance between the substrate and the coil.

The reactor (2) dimensions are determined according to the substrate (4) size and solution (3) amount to be used, and the reactor (2) prepared for synthesis reaction is made ready for use. A synthesis solution (3) suitable for the zeolite type that is desired to be obtained is prepared. After the substrate (4) is made ready for use by being cleaned with suitable methods, it is vertically immersed in the synthesis solution (3) that is filled into the reactor (2). The reactor (2) is positioned such that the substrate (4) therein will remain within the magnetic field generated by the coil (6) connected to the induction device (5). Taking into account the possible reactor (2) dimensions, it is considered that it will be more suitable to keep the reactor (2) out of the coil (6). The distance between the coil (6) and the reactor (2) or the power of the induction device (5) is changed and adjusted so as to obtain the desired substrate (4) temperature. This temperature, together with the solution (3) temperature and synthesis time, determines the zeolite phase and the coating thickness which will be obtained. Referring to FIG. 2, in which a representation of the change in the substrate temperature according to the distance between the substrate and the coil is illustrated, in the system that is used, for a power value of 2 kW and a stainless steel substrate, when the distance between the substrate (4) and the coil (6) is 6 mm the substrate (4) temperature is approximately 65° C., when it is 8 mm the substrate (4) temperature is 55° C. and when it is 9 mm the substrate (4) temperature is 45° C.

Figure 3:
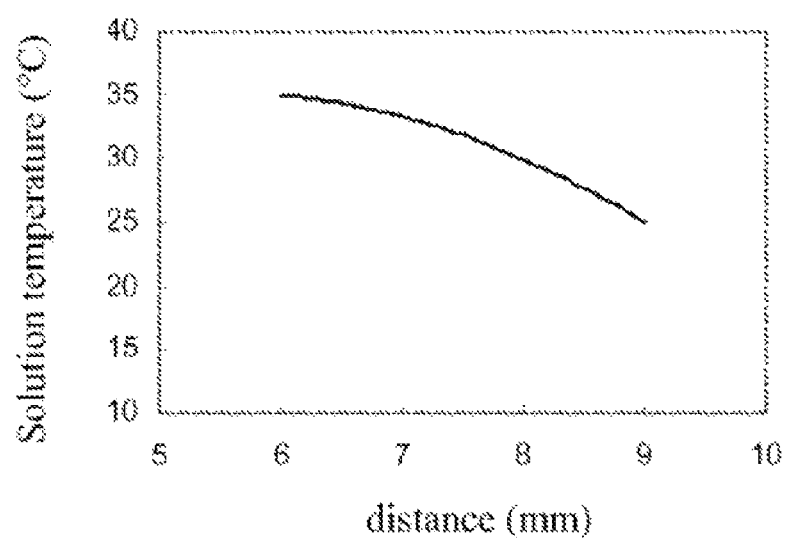
FIG. 3 is the representation of the change in the solution temperature according to the distance between the substrate and the coil.

The synthesis solution (3) is circulated by the help of a pump (9) between the water bath (S) having a temperature lower than the reaction temperature and the reactor (2). This way, the solution (3) is enabled to be kept at a temperature lower than that of the substrate (4) and the reaction is enabled to be concentrated not in the solution (3) but on the substrate (4). Although the synthesis solution (3) is not actually affected by the magnetic field, the heated substrate (4) also heats the solution (3) to some degree. Referring to FIG. 3, in which a representation of the change in the solution temperature according to the distance between the substrate and the coil is illustrated, when the water bath (S) temperature is 10° C., for a power value of 2 kW. when the distance between the substrate (4) and the coil (6) is 6 mm the solution (3) temperature is approximately 35° C., when it is 8 mm the solution (3) temperature is 30° C. and when it is 9 mm the solution (4) temperature is 25° C.

A magnetic field is produced around the substrate (4) by operating the induction device (5). Under the said conditions, the synthesis reaction within the reactor (2), whose top is covered, is carried out for a period of time that will allow generation of the desired phase. The substrate (4) which is coated with zeolite is removed from the system, washed with water and made ready for use.

In the method of directly heating the substrate (4) materials by conduction, the experiment duration required for obtaining thick coatings is fairly long. Furthermore, method of heating by conduction is not practical for coating large surfaces. In the inventive zeolite coating method and assembly, when the substrate (4) materials are heated remotely by induction, thick coatings with high effective diffusion coefficients are produced.

By means of the assembly (1) of the present invention, mass production can be carried out more economically and practically. The system of heating by induction performed in the assembly (1) of the present invention is practical; because, differing from the state of the art applications, it does not require large heating resistances and complicated reactors for coating large surfaces. The fact that the inventive method is economical is based on the fact that the period of time for obtaining a zeolite coating with the same coating thickness and at the same synthesis temperature via heating by induction is much shorter in comparison to the conventional methods and method of heating by conduction. For example, while zeolite A coating reaches a thickness of 100 µm at the end of 72 hours when heating is performed by conduction, the coating thickness reaches 210 µm within 6 hours when heating is performed by induction under the same conditions. When the conventional one-step method is used, 2-3 µm thickness is obtained at most. While zeolite X coating reaches a thickness of 110 µm within 48 hours via conventional synthesis, the said thickness is obtained within 4 hours when heating is performed by induction under the same conditions.

As a result of the experiments conducted related to the method of the present invention, it is observed that when heating by induction is applied, crystalline and thick zeolite A (210 µm) and zeolite X (110 µm) coatings in pure form are obtained on stainless steel.

This method can be employed for preparing thick zeolite coatings that may be used in applications related to adsorption and catalysis. It is especially very suitable for production of zeolite coatings with the necessary characteristics for adsorption heat pumps. Additionally, this method can also be used for preparation of thin or thick coatings of the other adsorbents which can be directly obtained from a solution via crystallization.

Within the scope of these basic concepts, it is possible to develop various embodiments of the inventive "A zeolite coating preparation assembly (1) and operation method". The invention cannot be limited to the examples described herein and it is essentially as defined in the claims.

I claim:

1. A method of synthesizing a zeolite coating for performing in an assembly, comprising the steps of:
    preparing a reactor, which is made of a material that is not electrically conductive;
    preparing a dilute synthesis solution and filling it into the reactor; cleaning an electrically conductive substrate and placing it in the synthesis solution filled into the reactor;
    placing the reactor near a coil of an induction device;
    adjusting the distance between the coil and the reactor, adjusting the power of the induction device, or both, so as to provide a desired substrate temperature;
    circulating the synthesis solution that is in the reactor by the help of a pump via a connection line lying between a feeding tank which is immersed in a water bath, and the reactor, so that a part of the synthesis solution is fed into the feeding tank;
    adjusting the water bath temperature with the help of a heat exchanger in order to keep the temperature of the synthesis solution in the feeding tank at a value to assure that the temperature of the synthesis solution in the reactor remains at a desired value that is lower than the temperature of the substrate;
    producing magnetic field by operating the induction device;
    performing the synthesis at the desired substrate and solution temperatures and time;
    removing the substrate from the solution;
    cleaning the zeolite coating with water;
    obtaining a final product.

2. The method of synthesizing a zeolite coating for performing in an assembly according to claim 1, wherein the substrate is made of a ferromagnetic material for enhancing the effect of the magnetic field generated by the induction device.

3. The method of synthesizing a zeolite coating for performing in an assembly according to claim 2, comprising vertically immersing the substrate in the synthesis solution filled into the reactor.

4. The method of synthesizing a zeolite coating for performing in an assembly according to claim 1, comprising vertically immersing the substrate in the synthesis solution filled into the reactor.

* * * * *